Nov. 23, 1954 H. J. HAWTHORNE ET AL 2,695,158
FRACTURE TYPE ROCK CUTTER
Filed Nov. 30, 1949 7 Sheets-Sheet 3

HERB. J. HAWTHORNE
EARL M. WEAVER
INVENTORS

BY Lester B Clark
& Ray L Smith

ATTORNEYS

Nov. 23, 1954

H. J. HAWTHORNE ET AL 2,695,158

FRACTURE TYPE ROCK CUTTER

Filed Nov. 30, 1949

INVENTORS
H. J. Hawthorne
Earl M. Weaver.

BY Cushman, Darby & Cushman
ATTORNEYS

United States Patent Office 2,695,158
Patented Nov. 23, 1954

2,695,158

FRACTURE TYPE ROCK CUTTER

Herbert J. Hawthorne and Earl M. Weaver, Houston, Tex.

Application November 30, 1949, Serial No. 130,192

5 Claims. (Cl. 255—61)

The invention relates to a means and method of removing earth formations from a well bore by applying a thrust and abrasive force against the earth formation by rotating a drill bit in the rotary method of drilling wells.

In the past it has been the practice to rotate the drill bit of either the rock cutter type or the drag bit type for abrading away the formation material so as to accomplish the drilling of the well bore. By the use of such prior bits the formation has been abraded either by the drag bit type of bit or by creating chips in the form of small cuttings by the tooth type of rotating cone bit.

The present type of fracture bit applies the thrust of the rotating bit against the formation by the application of the thrust through relatively small finger-like members which contact the earth formation at only relatively small areas as compared with the total area of the bottom of the well bore which is being cut.

It is one of the objects of the present invention to provide abrading and fracture fingers which may be specifically explained as arcuate rectangular circumferentially arranged tines or fingers which contact the formation and transmit the load and rotational force applied to the bit against the formation.

It is one of the objects of the invention to provide a plurality of sets of these radially spaced circumferentially curved and vertically stepped fingers so that as the bit rotates each finger will cut or abrade an annular groove in the bottom of the well bore in such a manner that annular ridges or ribs will remain between the abraded grooves.

Another object of the invention is to provide a fracture type bit wherein the fingers will abrade annular grooves while upstanding ridges of formation remain to be fractured by the downward and rotational force of the fingers of the bit so that the force vector applied to the formation will be approximately along a forty-five degree angle downwardly and inwardly from the base of each of the grooves being cut by the fingers so as to fracture cuttings or segments of the ridges in the form of arcuate chips.

Another object of the invention is to abrade approximately forty per cent of the bottom of the earth formation and to fracture the remaining sixty per cent of the formation from its position in the bottom of the well bore so as to increase the speed and efficiency of the drilling of the well bore because of the relatively small percentage of the material which must be abraded from the bottom of the well bore.

Still another object of the invention is to provide a replaceable blade drag and fracture type bit wherein the spaced circumferentially arranged and vertically stepped fingers cut ridges and fracture the material therefrom in the bottom of the well bore.

A still further object of the invention is to provide an integral fracture type drag bit wherein the unitary body has a plurality of downwardly extending regularly spaced circumferentially curved and vertically spaced abrading fingers thereon.

A still further object of the invention is to provide a fracture type bit wherein the abrading and fracture fingers will be arranged in different circumferential, radial and vertically spaced patterns on the bit body regardless of whether the body is made up of an integral member or of segmental blade sections or segments.

A still further object of the invention is to provide a fracture type bit wherein fracture webs extend upwardly and inwardly toward the center of the bit from the inside portion of the blades so as to fracture chips or segments from the ribs which remain uncut between the grooves which are abraded by the fracture type fingers extending downwardly from the bit body.

Other and further objects of the invention will be readily apparent when the following description is considered in connection with the accompanying drawings wherein.

The present invention relates generally to the same subject matter as that disclosed in the following prior co-pending applications for patent and is entitled to the benefit of the filing date of such applications of joint inventorship as to all of common subject matter: Herbert J. Hawthorne, Serial No. 612,416, filed August 24, 1945, now Patent No. 2,615,684, for a Detachable Blade Bit; Herbert J. Hawthorne, Serial No. 794,239, filed December 29, 1947, now Patent No. 2,666,622, for a Detachable Blade Bit; Herbert J. Hawthorne and Earl M. Weaver, Serial No. 70,622, filed January 13, 1949, for Finger Blade Drag Bit; Herbert J. Hawthorne and Earl M. Weaver, Serial No. 130,191, filed November 30, 1949, for Removable Blade Drag Bit.

Figure 1:
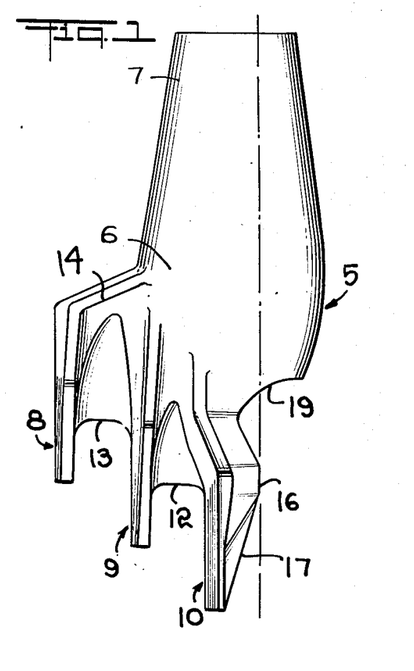
Fig. 1 is an outside elevation of one of the bit segments illustrating the shank and finger arrangement of the parts.
Figure 2:
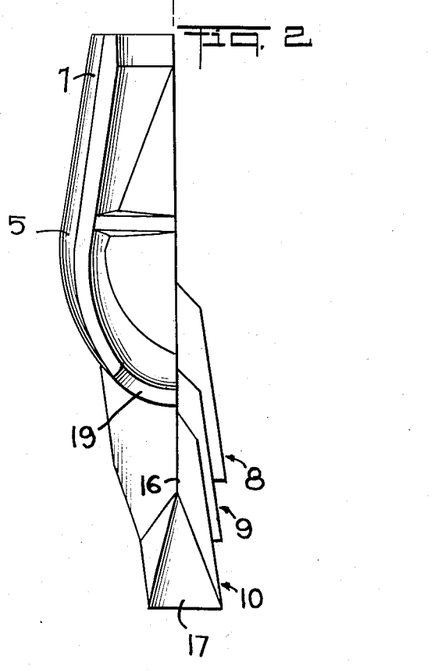
Fig. 2 is an elevation the same as Fig. 1 except illustrating an edge view of the bit.

As particularly pointed out in the last enumerated application above the bit may be made up of a plurality of blade segments designated generally as 5 as seen in Fig. 1. Each of these segments may be said to be made up of a body 6 having the shanks 7 and downwardly extending abrading fingers designated generally as 8, 9, and 10.

Figure 4:
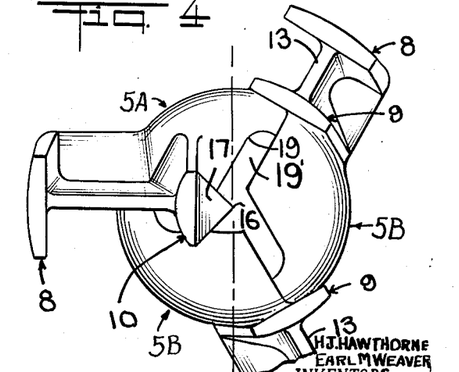
Fig. 4 is a bottom plan view looking at a bit which has been assembled from three blade segments of the type shown in Fig. 1, but with different finger spacings.

These fingers are radially arranged upon the segment 5 when it is positioned on the bit body or assembled as a portion of the bit for drilling operation. The segment will take the position, for instance, as shown in Fig. 4.

As seen in Fig. 1 the finger 10 is nearest to the center of the segment of Fig. 1 and then the next radially outward and vertically upwardly stepped finger is finger 9. The outermost and uppermost radially arranged finger is finger 8. Each of the fingers is radially spaced from the other and extends downwardly a substantial distance below a web 12 between fingers 9 and 10 and a web 13 between fingers 8 and 9.

Finger 8 extends radially outward a substantial distance as is illustrated by the outstanding shoulder 14 as best seen in Fig. 1.

Figure 3:
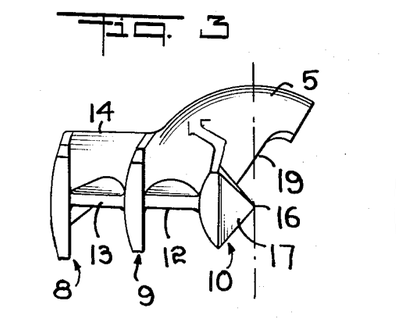
Fig. 3 is a bottom plan view looking upwardly at the blade segment of Figs. 1 and 2.

Fig. 3 shows a bottom plan view looking up at the fingers 8, 9 and 10 and also illustrates the webs 12 and 13. Finger 10 has an inwardly directed projecting portion 16 and the inclined breaker web 17 by which a ridge of formation being cut remaining inwardly of the groove cut by the finger 10 will be fractured or broken as the drilling proceeds.

The body 6 of the blade is cut away at 19' so as to create a water course or discharge port 19 which is best seen in the assembly view of Fig. 4.

Figs. 3 and 4 show the substantially rectangular cross-sectional area of the several fingers 8, 9, and 10 so as to illustrate the tremendous amount of material which will be available for wear upon a relatively narrow circumferential path or groove which is to be cut by each of the fingers.

Particular attention is also directed to Fig. 4 to illustrate the difference in arrangement of the radial spacing of the fingers on the three different blades which are used to make up an exemplary composite bit. In practice, a given segment may not have all three of fingers 8, 9 and 10. On the contrary, given segments may have only one or two of these fingers. In this way the total cutting area may be distributed as required to equalize the wear of the respective fingers. That is, the outwardly positioned fingers will travel further, and thus wear down faster than inner fingers, unless there are more of the outer fingers.

However, it is to be distinctly understood that the segments employed may have any arrangement of fingers 8, 9 and 10.

One of the advantages as has been pointed out in the prior applications referred to above resides in the fact that the blade segments may be of forged and heat treated material and hard surfacing may be applied to the desired portions thereof so that a suitable structure has been provided which results in long and satisfactory service and in the uniform production of the segments so that they may be stocked in the various warehouses and supplied either in sets or individually as may be desired.

Figure 5:
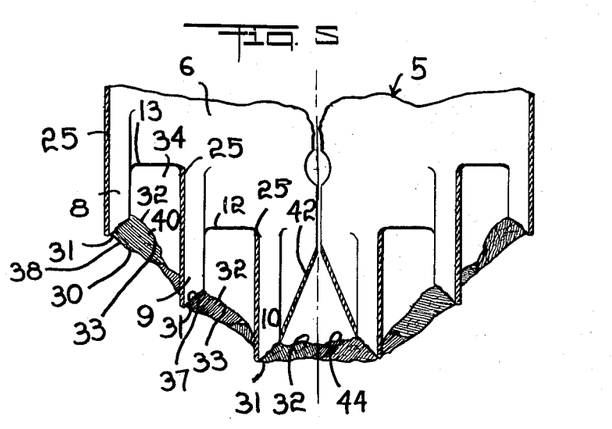
Fig. 5 is a vertical sectional view through the fingers of two of the segments to illustrate the composite arrangement of the cutting of the grooves and the formation of the ridges therebetween as the bit accomplishes the abrading and fracturing action against the earth formation.

Fig. 5 is a vertical section through the bottom of the well bore and two of the blade segments of the type shown in Fig. 1 and the section will of course be taken at an angle through the center so as to follow the radial section through two of the three segments.

While the drawings and description herein are primarily directed to what is generally known as a three-way or three blade bit it is to be distinctly understood that two, four, or any desired number of blades may be radially arranged when constructing the bit.

The three-way bit has been found to be satisfactory because it avoids a substantial amount of chattering because of the three-point suspension of the load on the bottom of the well bore.

In Fig. 5 the body portion 6 of each of the segments 5 has been illustrated as each having the fingers thereon and the fingers 8, 9 and 10 are shown in the form in which they would appear after a relatively small amount of drilling had been accomplished.

Each of the fingers 8, 9 and 10 is illustrated as having a facing of hard surfacing material 25 thereon on the outer peripheral face of the fingers so as to provide a hard wear resistant surface which will accomplish the maximum amount of abrasion upon the earth formation 30.

As seen in Fig. 5 each of the fingers is cutting a groove 31 which is in the form of an annular path in which the lower end of the finger contacts earth formation 30. In this manner each finger cuts a groove but leaves an upstanding amount of formation 32 which is in the form of a ridge 33 upstanding in the radial spacing 34 between the fingers such as 8, 9, and 10. In this manner only a small percentage of the earth formation 30 is actually abraded by the fingers and as will be hereinafter explained this amount of material which is abraded approximates forty per cent of the material which is to be removed.

The remaining sixty per cent of the material is in the ridge 32 and is not abraded by the fingers 8, 9, or 10.

It will be apparent from Fig. 5 that the load downwardly on the bit due to the weight of the drill pipe which is allowed to rest upon the bit applies a thrust or force at 31 in the bottom of the groove which is being abraded by the fingers. Of course the rigid material of the earth formation is present radially outward past the reaming or cutting outer surface 25 whereas the grooves cut by each finger are disposed inwardly of this outer surface and this leaves the upstanding ridge material at 32 between the blades. When the tremendous thrust of the bit is applied in the grooves this force of course must be resultant and will follow the path of least resistance. It has been found that the lower ends of the fingers, such as 8, 9, and 10, serve to cut the grooves in such a manner that the downward thrust of the bit is transmitted downwardly and inwardly against the surface such as 37. This is in the form of a force vector which is applied in the formation and has been found to be directed at approximately an angle of forty-five degrees downwardly and inwardly toward the center of the well bore. This application of such a tremendous force applies a fracturing pressure against the earth formation of the ridge 32 and it has been found in actual practice that a fracture occurs along the line 38 which is along the path of the force vector applied by the pressure of the abrading fingers. In this manner the chips, such as 40, will be fractured from the bottom of the well bore and of course the circulating drilling mud will carry this chip away from the bottom of the well bore so as to permit the fingers to continue the abrading of the groove to create additional ridge formation 32 so that additional fracturing and chipping action will occur.

The chips of Fig. 5 are sectioned differently so as to emphasize the construction and arrangement which has been found to occur at the time of this fracturing or chipping action.

Particular attention is directed to the finger 10, as best seen in Fig. 5, and attention is directed also to the fracture web 42 which is in the form of an upwardly and inwardly inclined web extending from the lower inner edge of the finger 10.

This web serves to fracture the central material 44 which remains in the center of the well bore by fracturing the central segment or chip as the finger 10 rotates around in the bottom of the well bore and applies the vector thrust first at one side and then succeedingly around the chip so as to eventually force it to fracture loose from its position.

The radial spacing and circumferential open space between the several sets or series of blades as best seen in the plan view of Fig. 4 affords a substantial space for the circulation of the drilling fluid to carry chips, fractured segments or cutting away from the contact area.

Figs. 6 through 8B inclusive illustrate the various stages of the wearing away of the fingers of the bit and illustrate the form of cuttings which can be expected as the different degrees of wear occur. Particular attention is directed to Fig. 8 which shows that the fingers have been worn until the actual webs, such as 12 and 13, are themselves substantially worn. Such wear may not be desirable in some instances because it applies too great a contact area as between the bit structure and the formation so that there is a tendency to abrade a greater percentage of the material on the one hand and to fracture segments or chips from the earth formation as will be observed in 8A and also the application of the load causes the fracturing of smaller chips as shown in 8B.

Figure 9:
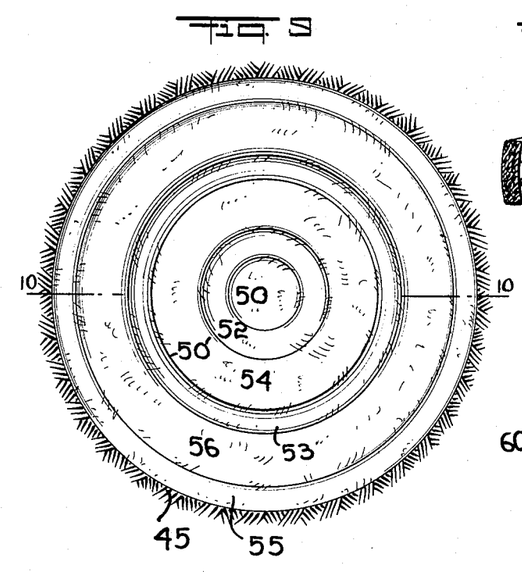
Fig. 9 is a plan view looking down on the bottom of the well bore and illustrating the arrangement of the grooves which are abraded and the spaced ribs or ridges therebetween which remain unabraded.
Figure 10:
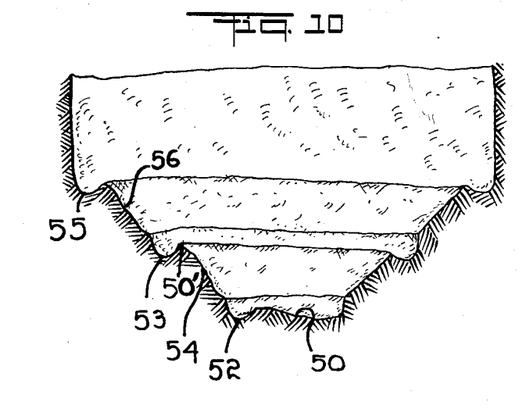
Fig. 10 is a vertical sectional view of the well bore taken on the line 10—10 of Fig. 9 and illustrating the circular path or groove which is cut by the several fingers and also illustrating the fracture areas between the abraded paths or grooves and particularly illustrates the vertically stepped and radially spaced arrangement of the grooves and the fracture area.

Figs. 9 and 10 are particularly illustrative of the contour and configuration of the bottom 45 of the well bore where the relative grooves and ridges have been illustrated.

The radial arrangement of the grooves or abrasion paths have been shown.

Figure 6:
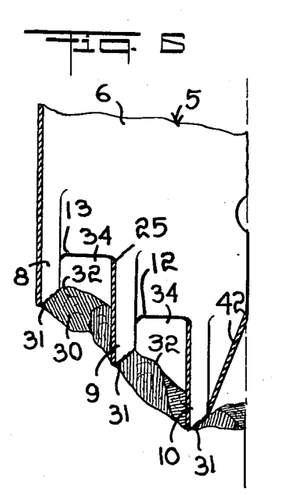
Fig. 6 is a half-sectional view like Fig. 5 except the fingers of the bit have been worn to a considerable extent and have abraded grooves so as to have created the upstanding ridges which are being fractured from the bottom of the well bore.
Figure 6A:
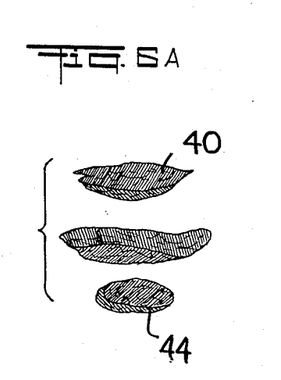
Figs. 6A and 6B show different forms of chips or cuttings which have been fractured from the bottom of the well bore due to the application of the thrust on the drill bit to cause the ridge structure between the abraded grooves to chip out of its position to accomplish the drilling of the well bore.
Figure 6B:
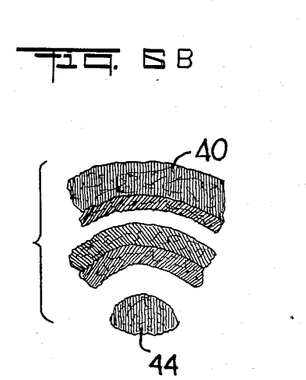
Figures 7, 7A:
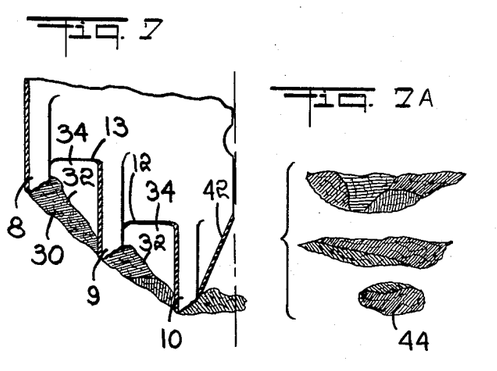
Fig. 7 is a view similar to Figs. 5 and 6 but illustrating the fingers as having been worn substantially further than in the view of Fig. 6.
Figs. 7A and 7B show different forms of chips or cuttings which have been fractured from ridges between the grooves abraded by the fingers.
Figure 7B:
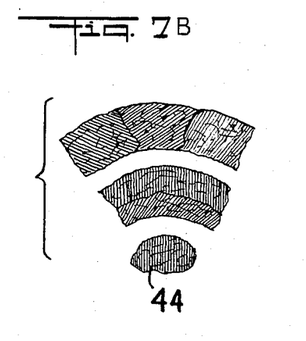
Figure 8:
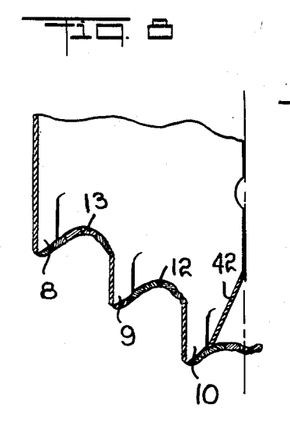
Fig. 8 is a still further illustration of the wearing away of the fingers and illustrating the wearing of the bit webs between the fingers and illustrating a different form of chip or cutting which is abraded away as the wear on the fingers continues.
Figures 8A, 8B:
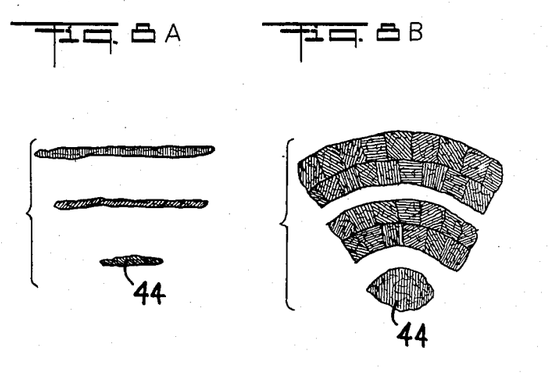
Figs. 8A and 8B show the thickness and breadth of the chips or segments which are fractured from the earth formation.

For instance, in Fig. 10 the central area will be designated as the fracture area 50 of the bottom of the well bore and this fracture area is created by the cutting of the abrasive path No. 1 as shown at 52. This path is abraded by the No. 1 finger designated as finger 10 in Fig. 1. The abrading of this path 52 applies vector force of the finger against the earth formation so as to chip or fracture the central segment therefrom such as the segment 44 as shown in Fig. 6A.

In view of the fact that the fingers are radially spaced and vertically stepped upwardly and outwardly relative to each other it will be obvious that the No. 2 finger, such as 9, will cut a groove or abrasion path 53 which is disposed radially outward in the well bore and upwardly vertical so as to leave a fracture area 54 between the abrasive grooves 52 and 53. This fracture area No. 2 will be subjected to the resultant vector due to the thrusts applied to the drill bit and this abrasive area, as it penetrates below the crest 50' of the intermediate ridge 54 applies a fracturing force below the exposed surface of this ridge so as to cause the chips to fracture loose as seen in Figs. 6 through 8B.

The circular abrasion path 55 created by the finger No. 3 on the outermost periphery then leaves the fracture area No. 3 in the form of the rib or ridge 56 disposed between the grooves 53 and 55. In this manner it will be obvious that various types of segments or cuttings will be fractured loose as the drill bit continues its rotation.

This fracturing action occurs because of the fact that there is an unbalanced force applied to the abrasion path or groove which is directed generally at an angle approximating forty-five degrees with vertical. This fractural area or line of cleavage has been found to exist in practically all of the earth or rock formations which have been encountered and it is believed therefore to be substantially correct to point out that the line of fracture approximates forty-five degrees with respect to the vertical or with respect to the horizontal as the case may be.

It will be readily apparent from a comparison of, for instance, Figs. 5 and 10 that a substantial amount of the earth formation is fractured loose from its position so that there will be a substantial reduction in the percentage of the formation which must be drilled or abraded loose from its natural position.

Figure 11:
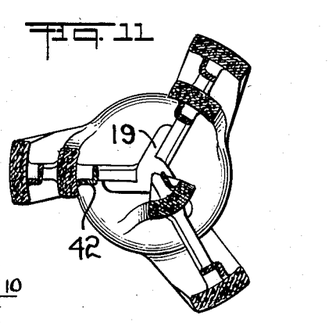
Fig. 11 is a transverse sectional view looking upwardly along a transverse plane taken through the fingers so as to illustrate the arcuate configuration and the rectangular sectional area of the different fingers of the bit.

Fig. 11 shows a transverse sectional view of the bit with the section taken through the various fingers of the drill bit so as to illustrate the application of the hard surfacing material thereto so as to abrade the well formation to a substantially greater extent and to also provide an illustration of the arcuate curvature of the several blades and to illustrate the length and breadth of the rectangular cross-sectional area of the several fingers.

Figure 12:
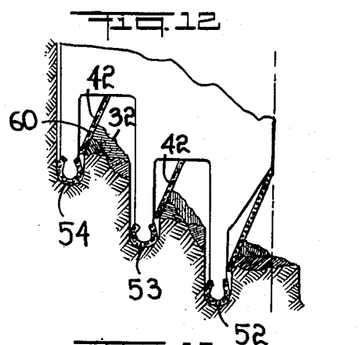
Fig. 12 is a vertical elevation of the fingers and particularly showing the hard surfacing which has been applied to the fingers and to the fracture or breaker web which inclines upwardly and inwardly from the inner side of the fingers so as to fracture or break the ridges which are created between the fingers.
Figure 13:
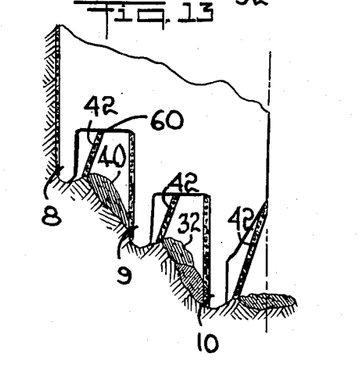
Fig. 13 is a view similar to Fig. 12 but illustrating the fingers after substantial wear has occurred so as to illustrate that with greater wear of the fingers a greater percentage of the material is abraded as compared with the amount or percentage of material which is fractured.

Attention is also directed to the fact that each of the fingers of Figs. 11 through 13 have been illustrated as carrying the fracture web 42 so as to apply the radially inward thrust or pressure against the ridge or rib material heretofore described.

The particular fracturing action is emphasized in the view shown at Figs. 12 and 13 due to the fact that this fracture web 42 has the hard surfacing material 60 thereon so as to increase the amount of wear or abrading action thereon and the angularly inward application of force against the ridge material has been illustrated because as the bit continues to abrade the grooves such as 52, 53, and 55 of Fig. 10 it will be obvious that the wedge construction of the breaker web is forced into the groove tending to widen the groove and tending to fracture loose the chips or segments 32 as previously described in connection with Fig. 5.

Figs. 12 and 13 illustrate the various degrees of wear of the fingers and the breaker webs to show that a greater amount of material must be abraded as the fingers continue to wear due to the fact that the area of the finger and the breaker web 42 which comes in contact with the earth formation is greater as wear occurs on the fingers due to the greater exposed area of the finger and its breaker web in contact with the earth formation.

Figures 14, 15, 16:
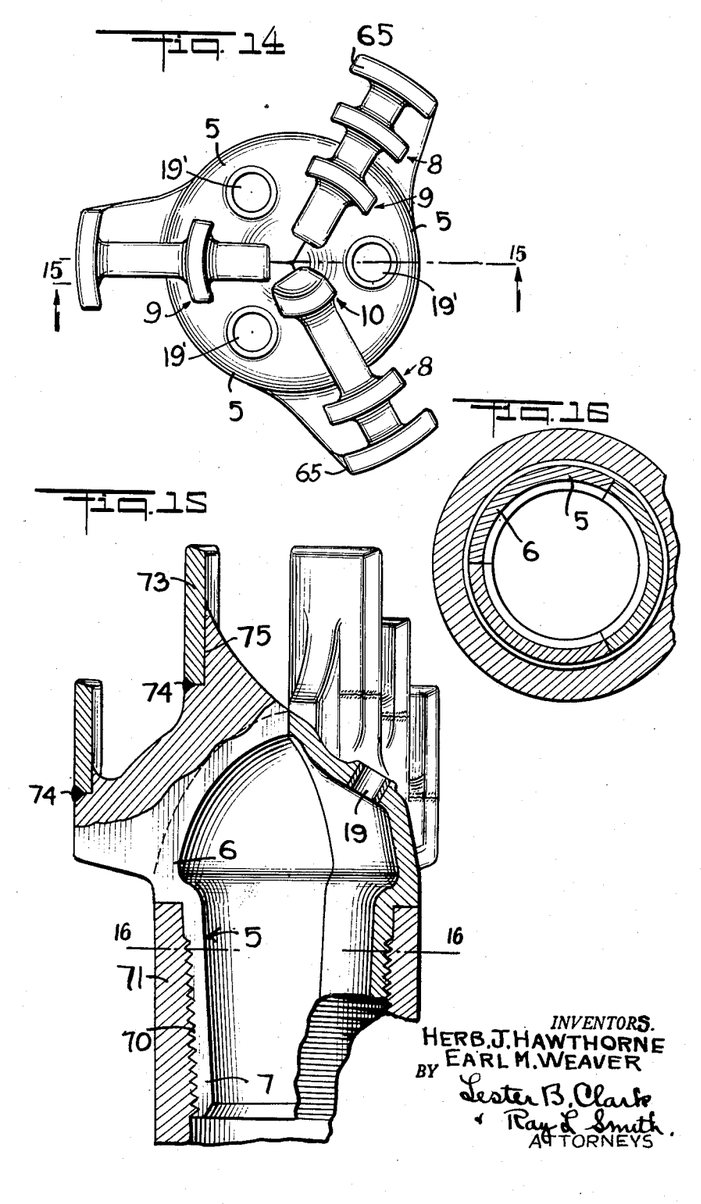
Fig. 14 is a bottom plan view of a modified form of bit and illustrating the arrangement of the fingers on the different blades of the bit so as to illustrate the non-tracking arrangement of the several fingers on the several blades.
Fig. 15 is a sectional view taken on the line 15—15 of Fig. 14 and illustrating some of the fingers and the body in section so as to illustrate how the wearing portion of each of the fingers may be in the form of a welded-on plate or segment which can be readily replaced after it has rendered the service of abrading the earth formation.
Fig. 16 is a section taken on the line 16—16 of Fig. 15 and illustrating the arrangement of the assembly of the three shanks or segments of the bit blades so that they will be threaded as a unitary member to be received in the drill pipe whereby rotation and axial thrust may be applied to the bit in the drilling operation.

Fig. 14 is a bottom plan view looking at a slightly modified form of the blade structure wherein there are as a matter of fact four radially arranged fingers which will be numbers 8, 9 and 10, the same as in Fig. 1 except that a fourth blade 65 has been illustrated so as to maintain desirable spacing between fingers for larger size bits. Each of the three blades of Fig. 14 has a different number of fingers, the left hand segment having only two fingers which are fingers 9, 4 and 65 whereas the lower right hand blade has fingers 65, 8 and 10, while the upper right hand blade or segment has fingers 8, 9 and 65. It seems obvious that any desired configuration or arrangement may be used in providing a structure of the blades and the fingers.

Each of the three blades of Fig. 14 has a different number of fingers because the left hand segment shows only two fingers which are fingers Nos. 2 and 4 whereas the lower right hand blade illustrates Figs. 1, 3, and 4, while the upper right hand blade or segment illustrates Figs. 2, 3, and 4. It seems obvious that any desired configuration or arrangement may be used in providing a structure of the blades and the fingers.

Figs. 15 and 16 illustrate the assembly of the blades and the bit body, Fig. 16 particularly showing the three shanks 5 of the three segments 6 as having been assembled together and having been threaded at 70 as a unitary device so that they may be received in the socket 71 which is the lower end of the drill pipe or drill collar as the case may be.

Particular attention is directed to the plates or wear-resistant blade portions 73, best seen in Fig. 15. These have been applied by a bead of welding material 74 after having been deposited in a pre-formed socket or pocket 75 in the lower end of the blade body. With this arrangement when the portion 73 becomes worn they may be cut off in any desired manner and a new and additional section welded in position so as to renew the bit for actual use after its normal and natural wearing life has been dissipated.

Figure 17:
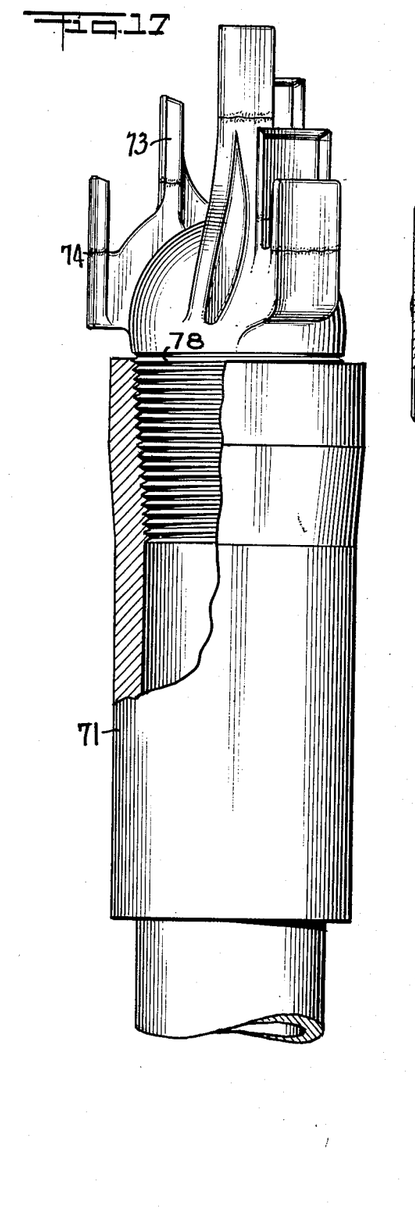
Fig. 17 shows a slightly modified form of the bit wherein the body is made as an integral member with the fingers welded thereon.
Figure 18:
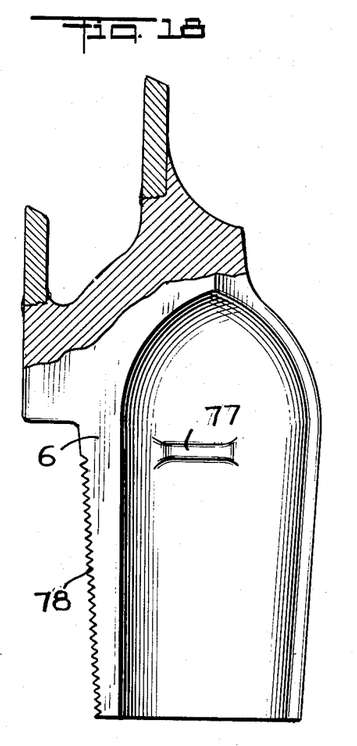
Fig. 18 shows one of the blade segments of the type used in Fig. 14 but showing a slightly modified form of segment which can be applied to a bit body and clamped in position thereon.

Fig. 17 shows a slightly modified form of bit and segment structure where the replaceable plates have been welded in position upon one of the sections 6 such as illustrated in Fig. 1. Any desired arrangement of finger placement may be provided as desired. The positioning lug 77 is illustrated interiorly of the blade segment and the threads 78 on the exterior of the segment illustrate the manner in which it will be connected to the bit body. The lugs and threads cooperate to hold the blade against movement. The lugs may be on the body and openings in the blade if desired as shown in Figs. 9 and 11 of our companion application.

Figure 19:
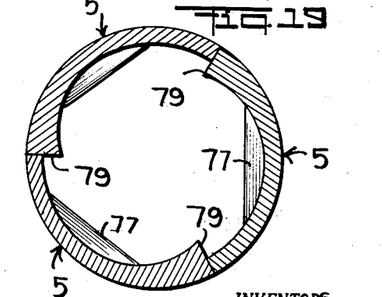
Fig. 19 is a transverse sectional view through the shanks of three of the segments of Fig. 18 to illustrate how the driving lugs or shoulders project inwardly to space and affix the segments upon the bit body.

Fig. 19 illustrates the driving notches 79, which may be provided on the edge of the shanks of the blades as is more fully described in the prior co-pending application last referred to hereinabove.

It seems obvious that the arrangement of the blades, the fingers, the webs and the breaker webs may be arranged as desired and it is to be specifically understood that each blade may have any arrangement of fingers as may be desired so as to obtain the cutting and abrasive action in combination with the fracturing which is most efficient.

It is also to be understood that the bit may be assembled of the replaceable blade segments. It may be made integral or the blades may be clamped in position by the locking bowl on a smooth outer peripheral surface of the several shanks or the shanks may be assembled together and threaded so that the clamping action may be obtained by threading a bowl, an adapter sub, or the drill pipe or drill collar directly on the shank of the bit regardless of whether it is an integral shank or whether the shank is made up of the shanks of the several segments which make up the bit.

Any desired arrangement of the courses or flushing fluid ports may be arranged as seen in several views of the drawings.

Generally the fingers have been found to be satisfactory in actual practice where they are formed as arcuate rectangles because this affords a substantial amount of material for wear along a relatively narrow path to abrade or cut a narrow groove as compared with the width of the ridge or rib which remains uncut and which is fractured away. In this manner a smaller percentage of the material is actually abraded and a larger percentage of the material is fractured away. In some instances chips or fractured arcuate segments have been obtained in actual service in relatively hard limestone and shale as well as sandstone formation which are an inch or more in length and in some instances half an inch in longitudinal cross section along the arc of the segment or chips.

Any desired amount and placement of the hard surfacing material may be employed and the blade segments are preferably of forged material so that they will be of uniform structure and make up and they can then be hard surfaced as desired. This permits the replacement of any segment with any other segment and the desired combination of cutter fingers and fracture webs can be obtained upon any bit.

Where the area between the adjacent fingers is relatively free of contact with the web or the breaker webs it has been found that the load or weight applied to the bit is concentrated upon a smaller area of the well bottom so that the load applied to the fingers is sufficient to accomplish the abrading action at such a rate that as the finger penetrates into the groove which is being formed not only the chattering of the bit tends to effect the fracturing thereof but also the depth of the groove causes the inner and outer edges of the fingers to abut against the wall of the ridge which is being formed so as to cause radial fracturing and the breaking away of arcuate chips which will be carried away from the bit area by the circulation of the drilling mud.

As an example of a particular bit according to the invention, the following mathematical calculations and computations are submitted as an illustration only of one size of bit.

Figure 20:
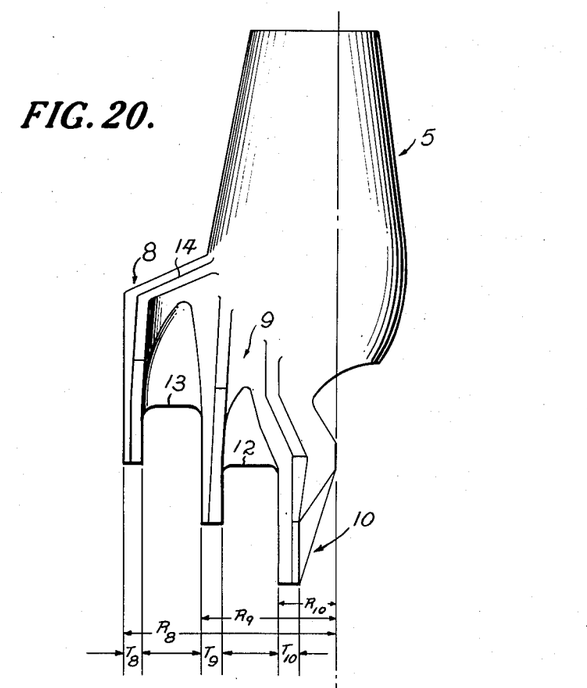
Figs. 20 and 21 show the structures of Figs. 1 and 2 with dimension labels applied.
Figure 21:
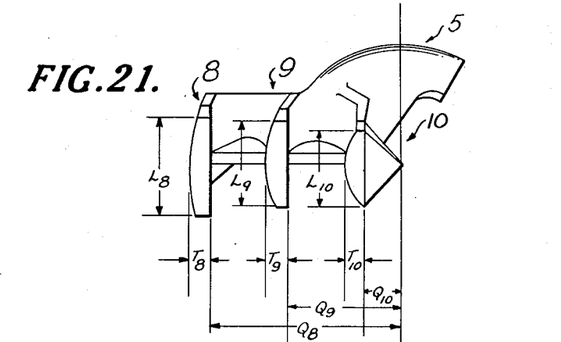

Referring to Figures 20 and 21, which show the structure of Figures 1 and 3, various reference characters are applied as follows:

$Q_8$, $Q_9$ and $Q_{10}$=radial distance from the central axis of bit to the inside of fingers 8, 9 and 10, respectively.
$R_8$, $R_9$ and $R_{10}$=radial distance from center axis of bit to outside of fingers 8, 9 and 10, respectively.
$L_8$, $L_9$ and $L_{10}$=arcuate length of fingers 8, 9 and 10, respectively.
$T_8$, $T_9$ and $T_{10}$=radial thickness of fingers 8, 9 and 10, respectively.

Further letting $F$=total area of circular paths covered by the fingers 8, 9 and 10, and
$F_8$, $F_9$ and $F_{10}$=area of circular path covered by fingers 8, 9 and 10, respectively, and
$G$=total area of material removed by fracture, and
$G_8$, $G_9$ and $G_{10}$=area of material removed by fracture by fingers 8, 9 and 10, respectively, and giving exemplary dimensions as follows:

$R_8 = 2\frac{1}{8}$ inches
$R_9 = 1\frac{3}{8}$ inches
$R_{10} = \frac{5}{8}$ inch
$Q_8 = 1\frac{7}{8}$ inches
$Q_9 = 1\frac{1}{8}$ inches
$Q_{10} = \frac{3}{8}$ inch Then:

$F = F_8 + F_9 + F_{10} = 3.1416[(R_8^2 - Q_8^2) + (R_9^2 - Q_9^2) + (R_{10}^2 - Q_{10}^2)] = 5.9$ square inches and $G = G_8 + G_9 + G_{10} = 3.1416[(Q_8^2 - R_9^2) + (Q_9^2 - R_{10}^2) + Q_{10}^2] = 8.20$ square inches Now, letting $A$=total bottom area=$\pi R_8^2 = 14.19$ square inches, then $\dfrac{F}{A} = \dfrac{5.98}{14.19} = 42$ percent=material removed by abrasion and $\dfrac{G}{A} = \dfrac{8.29}{14.19} = 58$ percent=material removed by fracture and $\dfrac{G}{F} = \dfrac{8.29}{5.98} = 1.385 = 38.5$ percent more material removed by fracture than by abrasion To provide the most suitable finger wear, having one blade with fingers 8 and 10 and two blades with fingers 9 and 10:

$$\frac{L_{10}}{R_{10}} \lessgtr \frac{2L_9}{R_9} \lessgtr \frac{3L_8}{R_8}$$

which is satisfied if $L_{10} = \frac{3}{4}$ inch
$L_9 = \frac{7}{8}$ inch
$L_8 = 1$ inch to wit:

$$1.20 < 1.27 < 1.41$$

To equalize the axial wearing away of the fingers, let $A_c$=total area of fingers contacting the bottom; $A_{c8}$, $A_{c9}$ and $A_{c10}$=bottom contact areas of fingers 8, 9 and 10. Having three blades, one with fingers 8 and 10 and two with fingers 8 and 9, there are three of fingers 8, two of fingers 9, and one finger 10, and letting $T_8 = R_8 - Q_8 = \frac{1}{4}$ inch
$T_9 = R_9 - Q_9 = \frac{1}{4}$ inch
$T_{10} = R_{10} - Q_{10} = \frac{1}{4}$ inch
$A_{c8} = T_8 L_8 = \frac{1}{4} \times 1 = \frac{1}{4}$ square inch (each finger)
$A_{c9} = T_9 L_9 = \frac{1}{4} \times \frac{7}{8} = \frac{7}{32}$ square inch (each finger)
$A_{c10} = T_{10} L_{10} = \frac{1}{4} \times \frac{3}{4} = \frac{3}{16}$ square inch (each finger)

whereby:

$3 A_{c8} = 3 \times \frac{1}{4} = \frac{12}{16}$ square inch
$2 A_{c9} = 2 \times \frac{7}{32} = \frac{7}{16}$ square inch
$A_{c10} = 1 \times \frac{3}{16} = \frac{3}{16}$ square inch and therefore the total finger abrading area in each groove is substantially in proportion to the total groove area, to thus equalize axial wear.

Broadly the invention contemplates a fracture type rock cutter wherein a relatively small percentage of the area of the well bottom is removed by abrasion and a relatively large percentage of the formation on the well bottom is removed by fracturing ridges which are created by the abrasion so that chips or fractured segments of substantial size are removed. The removal of these large fractured chips or segments result in a relatively high rate of drilling and an exceptionally long service from a bit of this type.

What is claimed is:

1. A replaceable blade bit for the rotary drilling of bore holes comprising a body adapted for rotation about a longitudinal axis, a plurality of blade sections on the body, each section having a plurality of fingers projecting downwardly thereof and terminating in a bottom end, said fingers being spaced apart radially on each section from said axis of rotation, each finger in cross-section being arcuate, said fingers being concentrically disposed and elongated in the circumferential direction while narrow in cross-section in the radial direction, the fingers being elongated axially and of uniform cross-section throughout their length so as to cut a narrow annular groove or path, the bottom ends of said fingers being respectively positioned at succeedingly higher elevations with respect to the bit body outwardly from said axis of rotation to create concentric fracture ridges stepped upwardly and outwardly, the arrangement being such that the ridges may remain intact until the forces applied by the bottom ends of the fingers in cutting said grooves cause the fracture of circumferential chips from the fracture ridges inwardly and downwardly as the fingers deepen the grooves due to the rotation and downward pressure of the bit on the formation.

2. A bit as in claim 1 wherein the bottom ends of the fingers are spaced at succeedingly higher elevations outwardly at a substantially 45° angle to said longitudinal and rotational axis of the bit.

3. A bit as in claim 2 wherein the total cross-sectional area of the cutting fingers is substantially equal to 40 percent of the area of a bore bottom drilled by the bit.

4. A bit as in claim 1 wherein the total cross-sectional area of the cutting fingers is substantially equal to 40 percent of the area of a bore bottom drilled by the bit.

5. A bit as in claim 1 and further including a fracture web upwardly and inwardly inclined with respect to the rotational and longitudinal axis of the bit, the fracture web connecting predetermined ones of the cutting fingers to the blade sections from which the fingers extend.

References Cited in the file of this patent

UNITED STATES PATENTS

| Number | Name | Date |
|---|---|---|
| 1,428,122 | Smith | Sept. 5, 1922 |
| 1,486,898 | Hundrieser | Mar. 18, 1924 |
| 1,514,415 | Arnot | Nov. 4, 1924 |
| 1,733,241 | Scott | Oct. 29, 1929 |
| 1,809,182 | Reese | June 9, 1931 |
| 1,809,351 | Oliver | June 9, 1931 |
| 1,899,771 | Reed | Feb. 28, 1933 |
| 2,498,251 | Creel | Feb. 21, 1950 |

FOREIGN PATENTS

| Number | Country | Date |
|---|---|---|
| 449,974 | Great Britain | July 8, 1936 |
| 606,377 | Great Britain | Aug. 12, 1948 |

OTHER REFERENCES

Herb. J. Hawthorne Bulletin No. 48–1, January 15, 1948, page 3.